March 30, 1943.  C. E. FRASER  2,315,254
FILTER BED CLEANER WITH ROTARY AGITATOR
Filed June 25, 1940
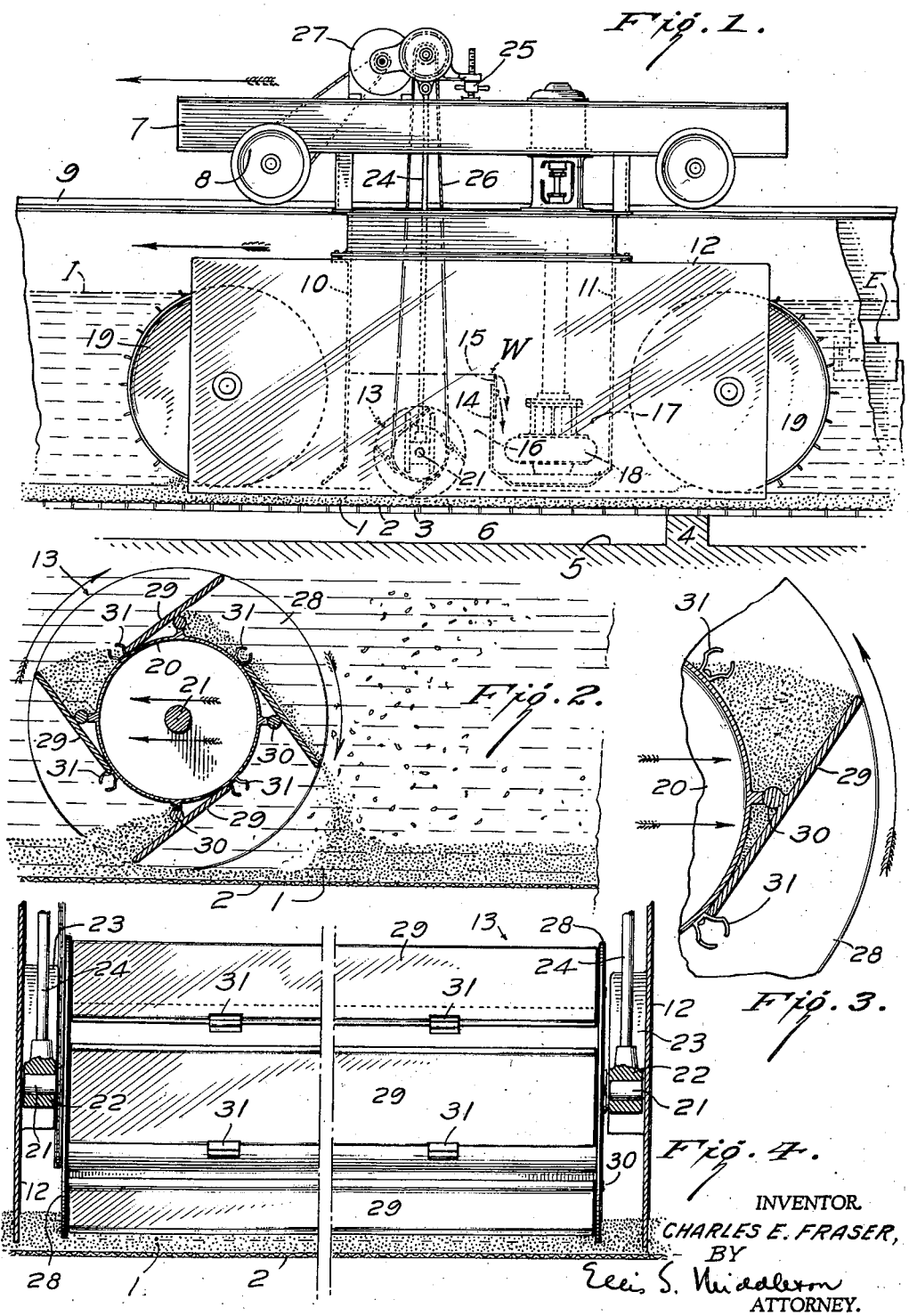
INVENTOR.
CHARLES E. FRASER,
BY
Ellis S. Middleton
ATTORNEY.

UNITED STATES PATENT OFFICE 2,315,254

FILTER BED CLEANER WITH ROTARY AGITATOR

Charles E. Fraser, Kew Gardens, N. Y.

Application June 25, 1940, Serial No. 342,253

9 Claims. (Cl. 210—128)

The present invention relates to a method of and mechanism for cleaning filter beds.

It is common practice in the treatment of sewage, industrial wastes, etc. to pass liquids containing the same through relatively shallow beds of sand, aggregate or the like, which removes the solids therefrom. Such beds, in the course of time, become clogged with the retained material, even though the raw material undergoing treatment has been subjected to preliminary treatment such as sedimentation or the like. As a consequence, it becomes necessary to restore the bed to somewhere near its initial solid removal capacity and this may be done by cleaning it either intermittently or continuously.

A popular type of cleaning mechanism for the above purpose consists of a travelling cleaner operated above the bed, which includes a cleaner caisson. The caisson is intended to make a sealing contact with the portion of the bed immediately thereunder and this is accomplished usually by extending the side walls of the caisson into the bed material a sufficient distance and by providing sealing means, such as hollow, rotating drums at each end of the caisson and sliding contact along the sides. Consequently, the small portion of the bed which is being cleaned is temporarily completely cut off from a filtering action.

The cleaner caisson may be divided into two compartments, in the first of which the filter bed material is agitated and the retained solids loosened therefrom, the wash water resulting from such action passing over into the second or wash water compartment from which it is removed by a pump for disposal or further treatment.

The above mechanism is applicable both to upflow and downflow filters.

In downflow filters, it is customary to flow the unfiltered influent, with or without previous treatment, such as sedimentation, directly on top of the filter bed, the liquid passing through the bed, the solids being caught thereby and clean effluent resulting. This effluent then moves from beneath the bed and into a disposal channel, the level of which is maintained slightly below the level of influent so as to provide a sufficient hydraulic head to cause liquid movement through the bed. As the resistance of a filter bed changes from time to time due to the quantum of retained solids therein, means are provided for varying the hydraulic head between the influent and effluent levels. This usually consists in arranging the parts so that the influent will automatically build up to a higher level than that of the effluent. This may conveniently take the form of an adjustable weir on the effluent discharge. This weir may be automatically operated within a narrow range, by a float on the influent side of the filter.

A convenient method of agitating a portion of the filter bed to clean the same may take the form of an intermittently operated solenoid where the bed material is of the magnetite sand variety. This electromagnet, submerged in the liquid, being located relatively close to the bed, when energized for the space of about a second, lifts a section of the magnetite sand immediately thereunder and this movement and the subsequent dropping of the sand back into the bed, tends to separate the solids caught by the sand therefrom. Inasmuch as the lifting of this magnetite creates a zone of lessened resistance in the bed at that point, if, as in a downflow filter, the effluent level is higher than the wash water level in the solenoid compartment in the caisson, there will be a back rush of clean effluent up through the bed at the area of lessened resistance, which washes the loosened solids from the magnetite, over the partition between the agitation compartment and wash water box and into the latter from which it is removed by a pump. This cleaning procedure may take place continuously.

Other mechanism for creating the area of agitation in the bed other than an electromagnet may consist of pipes projecting a suitable distance into the bed material either to simply disturb the bed or this disturbance may be facilitated by injecting air or other liquid through the pipes. These methods of agitation are also suitable for a bed of sand or other aggregate not of the magnetite variety.

In upflow filters, much the same procedure takes place although in that case, the influent to be filtered flows from beneath the bed, up through the bed material, the clean effluent being on top thereof. As before, the influent level must be above that of the effluent in order to induce this hydraulic flow. Likewise, the cleaner mechanism creates an area of agitation in the bed, but in this case, the flood of water through the area of lessened resistance caused thereby is that of unfiltered influent from below the bed, thus carrying the loosened dirt over the wash water weir and into the wash water box where it is removed by a pump.

In both cases, it is to be noted that the cleaner caisson defines an area of resistance against the flow of liquid therethrough and is cut off from the liquid surrounding it by the seals which exist at the side and ends thereof and that consequently, no filtering action takes place in the area covered by the cleaning mechanism.

The main function of the seals is to assist the wash water pump to create a back head and prevent the wash water from contaminating the effluent. In the case of downflow filters, the seals also prevent the unfiltered influent from above the bed leaking into the cleaner caisson and from thence through the bed at its area of lessened resistance to thus contaminate the clean effluent below. In the case of upflow filters, the seal prevents the rush of unfiltered influent moving up through the area of lessened resistance in the bed from leaking outwardly through the cleaner caisson to contaminate the clean effluent above the bed.

The principal object of the present invention is to provide an agitation device useful both for sand beds of the magnetite or silica variety not involving the use of magnetism or the injection of fluid below the bed surface.

In mechanical agitators, difficulty has been encountered in that the principal agitation takes place within narrow confines and only slightly above the upper level of the bed, the upflow of washing water being relied upon to completely loosen the dirt from the sand. Such a procedure is not always satisfactory, particularly when light or small mass bed material is used, inasmuch as a relatively high velocity of washing water is necessary for the purpose. This has a tendency to carry quantities of the bed material upwardly and into the wash water removal device.

The invention therefore contemplates a mechanical agitator which will pick up portions of the bed, elevate them and gradually drop the particles through the upflowing washing water, whereby the particles are cleansed and the dirt alone passes to the wash water disposal means.

The invention further contemplates a rotary device for accomplishing the above purpose having longitudinally disposed pockets thereon for picking up masses of the bed material as the cleaner passes thereover.

Inasmuch as many beds are of a rectangular shape wherein the cleaner travels thereover in a back and forth manner, the invention particularly contemplates a rotary device having pockets for picking up and dropping the bed through the ascending washing water, whereupon simple reversal of movement of the cleaner, the pockets will be reversed so as to perform the identical operations during the next direction of travel. The invention accomplishes the above objects by providing a rotary device having a cylindrical periphery which with pivoted outside walls, form a series of pockets, each wall being longitudinally pivoted at its center and the wall center being substantially at the upper surface of the bed material, upon reversal of movement of the rotary device, the wall is oscillated about its pivot so as to form with a portion of the periphery of the rotating cylinder a pocket operable in a reverse direction. Means are also provided for holding this pivoted wall in a fixed position during travel of the cleaner in one direction.

The invention further consists in the novel arrangement, combination and construction of parts more fully hereinafter described and shown in the accompanying drawing, in which—

Fig. 1 is a side elevation partly in section of an apparatus embodying the present invention;

Fig. 2 is an enlarged sectional detail of the rotary bed agitating means;

Fig. 3 is an enlarged sectional view of the right side of the device of Fig. 2 showing a wall occupying a reverse position;

Fig. 4 is a partial front view of the rotary agitator of Fig. 1.

Referring now to Fig. 1, the usual filter bed is shown at 1 of sand of any variety or any other aggregate or filter media. A suitable thickness of bed material rests upon screen 2 supported by grid 3 resting upon the top of wall 4 so as to slightly space the grid from the bottom 5 of the filter tank, leaving a space 6 therebetween.

A suitable cleaning mechanism may consist of a trolley 7 movable through wheels 8 driven by any suitable source of power, on trackway 9. Depending from the trolley is a caisson consisting of front wall 10, rear wall 11 and side walls 12. The rotary agitation creating means, which will be more fully described hereinafter is indicated generally at 13 located between front wall 10 and an intermediate wall 14, the top of which is provided with an adjustable weir 15. As shown, the agitator 13 is in what may be termed an agitation channel 16 through which dirty water rises, passes over the weir 15 into a wash water compartment 17 from which it may be removed by the pump 18.

At the front and rear of the cleaner and mounted between side walls 12 thereof, are rotatable sealing drums 19 which make not only sealing contact with the bed material 1 but also with the side walls 12. The latter extend a sufficient distance into the bed material so that with the drums 19, an area of the bed is effectively sealed from a filtering operation during the bed cleaning period.

The specific bed agitation means comprises a cylinder 20 mounted upon an axle 21 carried in end bearing blocks 22 held between pairs of abutments 23 projecting inwardly from the side walls 12. The bearing blocks 22 are carried on the ends of rods 24 supported for vertical adjustment as by the device 25 on the trolley 7. Rotation of the agitator 13 is accomplished by means of chain 26 driven through a gear train from motor 27 which may or may not be used to drive the wheels 8 of trolley 7.

The agitator 13 is provided at each end with discs 28 and longitudinally extending vanes 29 pivoted at their horizontal center as at 30 on the drum 20. It is to be noted from an inspection of Fig. 1 that the pivot 30 is so positioned that the bottom surface of a vane 29, if free to swing, would be substantially parallel to and at the surface of the bed.

Spring clips 31 secured to the drum 20 constitute retaining means for the vanes whether in the position shown in Fig. 2 or that of Fig. 3.

It will be thus apparent that regardless of the position of a vane when held by a spring 31, a pocket is formed between the vane and the periphery of the drum 20.

During a washing operation, regardless as to whether the filter system is of the downflow or upflow type and assuming the cleaner to be moving in the direction of the arrows of Fig. 1, it will be apparent that as the agitator 13 rotates in a clockwise direction, the vanes dig into the bed a desired extent, retain a portion of the bed material in the pocket formed between the vane 29 and the cylinder 20, elevate the same and drop it on the opposite side of the cylinder. During this time, cleaning water is rising in the channel 16 due to the fact that the bed immediately therebeneath has an area of lessened resistance created therein. This ascending liquid washes the loosened dirt from the bed material, carries it over the weir 15 into wash water compartment 17 from which it is removed by the pump. Due to the fact that the bed material is dropped through an appreciable height, a high velocity of upflowing washing liquid is not necessary. As a consequence, the tendency for bed material to be lost by flowing into wash water compartment is minimized.

In an annular filter bed, the cleaner operates in but a single direction as above indicated.

In rectangular beds, the cleaner has a back and forth movement with reversal of direction at each end of the bed. Consequently, the rotary agitator must provide for pockets operable in either direction of rotation thereof.

As shown in Fig. 1, and assuming the cleaner to be at the instant of moving to the right, that is, in reversing its direction of travel, it will be seen that rotation of the agitator 13 in a counter-clockwise direction will cause oscillation of the vane at the bottom of the agitator so that its left hand end will gradually approach the spring 31 until it has been forced into the position shown in Fig. 3. This occurs to each vane as the agitator rotates until all of them occupy the position shown in Fig. 3. Further movement of the cleaner toward the right causes a picking up of the bed material in the agitator pockets as before.

Inasmuch as the agitator may be raised or lowered through adjustment mechanism 25, the relationship of the vanes to the bed may be regulated with a nicety so as to disturb and/or pick up any amount of bed material desired.

Any number of such oscillating or pivoted vanes may be used, dependent upon the diameter of the drum 20 and the amount of material to be picked up in each pocket.

While the invention has been shown and described with particular reference to specific embodiments, it is to be understood that it is not to be limited thereto but is to be construed broadly and restricted solely by the scope of the appended claims.

I claim:

1. A filter cleaner adapted for back and forth movement over a filter bed, having means for making sealing contact with a bed for sealing off an area thereof from a filtering action, means for creating a zone of agitation in the said area of the bed, means for withdrawing dirt loosened in the zone of agitation, the agitation creating means including a rotary device having vanes pivoted on an axis substantially parallel to the axis of the rotary device and adapted to pick up, elevate and then drop bed material on the back and forth movement of the cleaner.

2. The device of claim 1 in which the vanes are pivoted substantially on their longitudinal center line.

3. The device of claim 1 in which the vanes are pivoted substantially on their longitudinal center line with spring means to retain the vane in one position.

4. The device of claim 1 in which the pivots for the vanes are only slightly above the normal upper level of the bed when the pivot is at its lowest point of travel.

5. A filter cleaner adapted for movement over a filter bed, having means for making sealing contact with a bed for sealing off an area thereof from a filtering action, means including a rotary device having a member pivoted on an axis substantially parallel to the axis of the rotary device, said member being adapted to move about its pivot to change its position when the direction of rotation of the rotary device is changed thereby to pick up, elevate and drop bed material upon rotation of the rotary device in either direction and means for withdrawing waste loosened by said rotary device.

6. The device of claim 5 with means for retaining the member in one position when the rotary device is rotated in one direction and in a different position when rotated in the opposite direction.

7. The device of claim 5 in which the members are a plurality of pivoted vanes.

8. A filter cleaner adapted for movement over a filter bed, having means for making sealing contact with a bed for sealing off an area thereof from a filtering action, a rotary drum, a plurality of vanes pivoted about the drum at substantially their longitudinal center, whereby the vanes may move to an effective position to pick up, elevate and drop bed material when the rotary device is rotated in either direction, and means for withdrawing odbjectionable material loosened from the bed by said vanes.

9. The device of claim 8 in which means is provided on the drum for releasably retaining the vanes in each of two positions.

CHARLES E. FRASER.